United States Patent [19]

Lemelson

[11] 4,012,790
[45] Mar. 15, 1977

[54] MAGNETIC TRANSDUCING APPARATUS FOR USING BOTH ENDLESS LOOP CARTRIDGES AND REEL-TO-REEL CASSETTES

[76] Inventor: Jerome H. Lemelson, 85 Rector St., Metuchen, N.J. 08840

[22] Filed: Nov. 14, 1974

[21] Appl. No.: 523,863

[52] U.S. Cl. .................. 360/94; 242/55.19 A; 242/200
[51] Int. Cl.² ............ G11B 23/04; G11B 25/06; G11B 15/00
[58] Field of Search .......... 360/94, 137, 96, 132, 360/93; 242/197, 198, 200, 55.19 A, 199

[56] References Cited
UNITED STATES PATENTS

| | | | |
|---|---|---|---|
| 3,385,534 | 5/1968 | Staar | 242/55.13 |
| 3,542,371 | 11/1970 | Saito | 360/93 |
| 3,561,767 | 2/1971 | Negishi | 360/94 |
| 3,593,946 | 7/1971 | Shardlow | 360/94 |
| 3,594,008 | 7/1971 | Takagi | 360/94 |
| 3,624,310 | 11/1971 | Mathey | 360/137 |
| 3,703,295 | 11/1972 | Yamamoto | 360/94 |

Primary Examiner—Alfred H. Eddleman

[57] ABSTRACT

A record playback unit for recordings on magnetic tapes disposed both in endless loop formations in cartridges and in reel-to-reel cassettes, wherein both are insertable into a single opening in the playback unit. A transducer and drive wheel assembly for the tape of the cassette is normally positioned to be inserted into the opening in the edge wall of the cassette together with a drive wheel for the tape of the cassette.

When a cartridge is inserted, its upper forward edge is detected by a limit switch, which is not actuated by an inserted cassette. The limit switch controls a solenoid or motor causing the cassette drive and transducer assembly to retract out of the way of the cartridge, to permit the cartridge to be pushed fully into the housing and to engage the cartridge-contained tape with a drive wheel and transducer at the far end of the housing. When a magnetic tape cassette is inserted into the opening and pushed to the far end thereof, it operates a second limit switch which causes the solenoid to advance the cassette drive unit consisting of a rotatable member, which is inserted into the cassette behind the tape, to cooperate with a common drive wheel for both the cassette and cartridge tapes and also engages respective drive means for the reels of the tape in the cassette into engagement with the reel hubs of the cassette. Removal of the cassette from the opening is effected by pulling or pushing on the cassette, which activates a further limit switch or manually closing a further limit switch operating the solenoid to retract the cassette drive unit out of the way of the cassette, so that the cassette may be removed from the housing.

8 Claims, 5 Drawing Figures

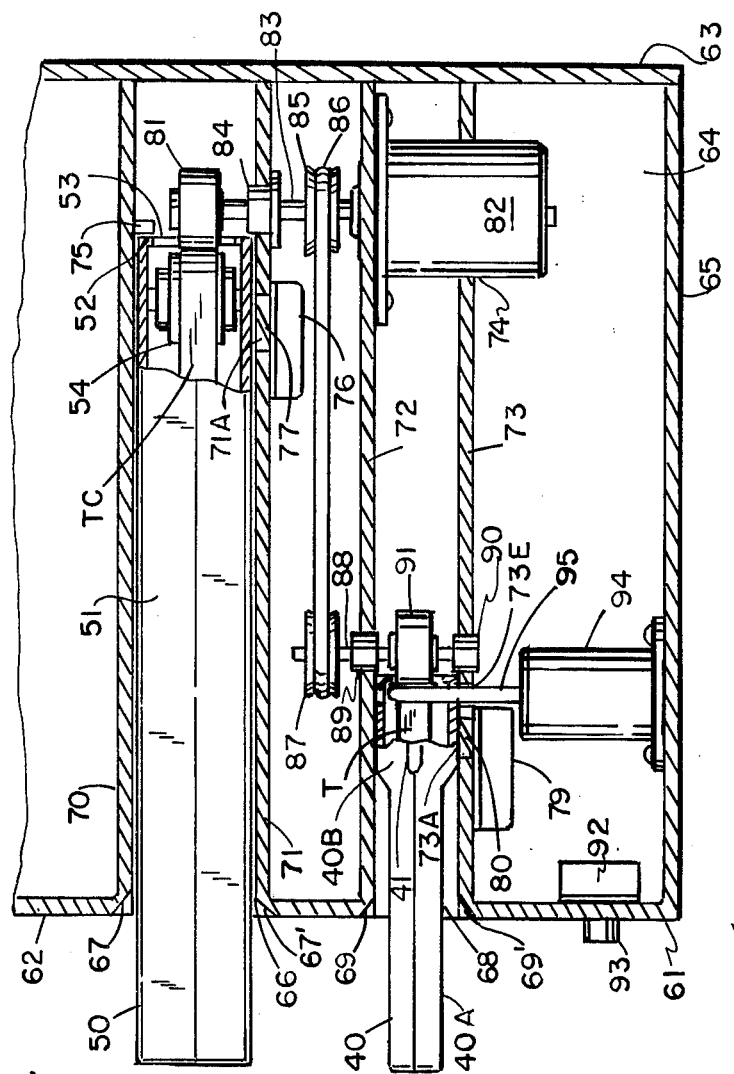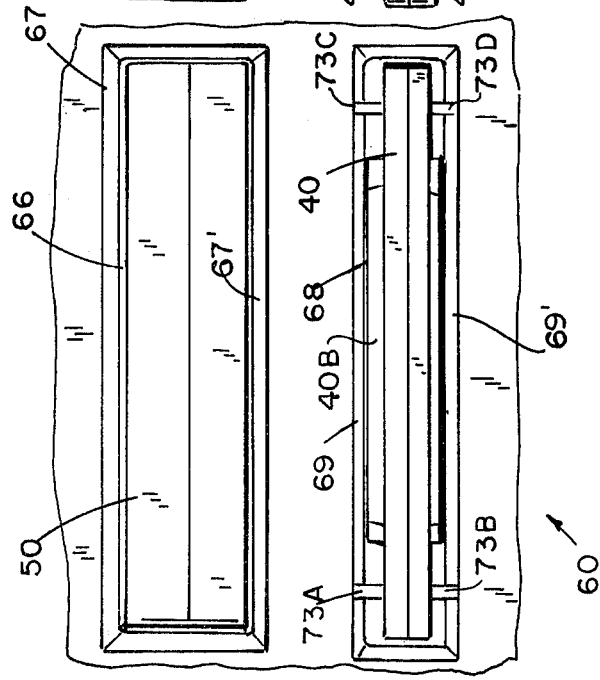

MAGNETIC TRANSDUCING APPARATUS FOR USING BOTH ENDLESS LOOP CARTRIDGES AND REEL-TO-REEL CASSETTES

SUMMARY OF THE INVENTION

This invention relates to an apparatus for transducing with respect to the record tapes of differently configured magazines such as a cartridge containing an endless loop formation of magnetic tape and a magazine or cassette containing magnetic tape extending between two reels which are adapted to be selectively rotated for taking up the tape in driving movement between the two reels.

It is known in the art to provide record playing units for tapes in cartridges or magazines of different configurations and different operating characteristics. One of such record playing units is adapted to receive a magazine containing two reels supported for rotation therein and a magnetic record tape approximately 3/16 inch wide. Such a magazine, commonly known as a cassette, is designed in accordance with specifications proposed by the North American Philips Corporation of New York, N.Y. The housing of this magazine contains five openings in a lateral edge wall thereof and means for guiding the tape between two reels rotationally supported in the housing, past said five openings. Directly behind each of the two endmost openings and extending through the sidewalls of the cassette housings, are respective aligned openings, at least one of which is adapted to receive a small cylindrical member which, in the conventional cassette player, is power rotated to drive the tape past the openings in cooperation with an idler or depressor wheel which is brought to bear against the tape through the respective edge opening. The housing contains spaced apart openings in the side walls thereof exposing respective hubs for the tape reels which are rotatably supported within the housing.

Also known in the art is a so called tape cartridge containing a magnetic tape approximately ¼ inch wide which is an endless loop formation of tape and is wound in a coil formation within the cartridge housing in a manner such that, when the tape is driven in the proper direction therein, it will be taken off the inside of the coil formation and fed onto the outside thereof wherein the coil formation is driven by movement of the tape. A present popular endless tape magazine or cartridge of the type described is manufactured and licensed by the Lear Jet Corporation of Tuscon, Ariz. and, like the cassette described, contains a standard housing configuration in which external dimensions and the operating mechanism therein are substantially similar for ball magazines.

Heretofore separate record playing units have been required for the differently configured and differently operating cassette and cartridge units, the cassette requiring, not only a different mount but also a drive means for the reels thereof.

In one form of the instant invention, a single opening in a record playing or recording unit is provided, into which opening may be inserted either a cartridge or cassette, either of which may be pushed into engagement with a drive wheel and one or more magnetic recording and or reproduction transducers located within the housing of the unit. A single drive wheel is provided which is configured to become inserted into the openings of either the cassette or cartridge and either fully engages the type of a cassette or engages a sufficient portion of the tape of a cartridge to permit it to drive same in cooperation with the idler wheel of the cartridge. Auxiliary means is provided for driving either of the two reels of a cassette, which auxiliary means is retracted when a cartridge is inserted.

In another form, a record playing unit is provided with separate openings for receiving a cartridge or a cassette and the common motor is employed for driving respective drive wheels for either the cartridge or cassette, depending on which is inserted into the respective openings in the housing.

Accordingly it is a primary object of this invention to provide a new and improved apparatus and method for transducing with respect to tapes wound in differently configured magazines.

Another object is to provide a record playing unit for transducing signals recorded on tapes supported within housings of different configurations and containing different drive means for the tapes thereof.

Another object is to provide a record playing apparatus adapted to receive and operatively locate either a tape magazine containing record tape wound between two reels supported within the magazine or a tape cartridge containing record tape wound in an endless loop and drive means for the tapes of either the reel-to-reel or endless tape magazines which is controlled in such a manner to prevent the improper driving of the endless wound tape in a wrong direction.

Another object is to provide a common playback apparatus for signals recorded on tapes disposed in endless loop tape cartridges and reel-to-reel magazines employing a single tape drive motor for the tapes of both magazines and switching controls for properly operating the drive motor in accordance with which of the two types of magazines are operatively located for playback.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed:

Figures 1, 2, 3:
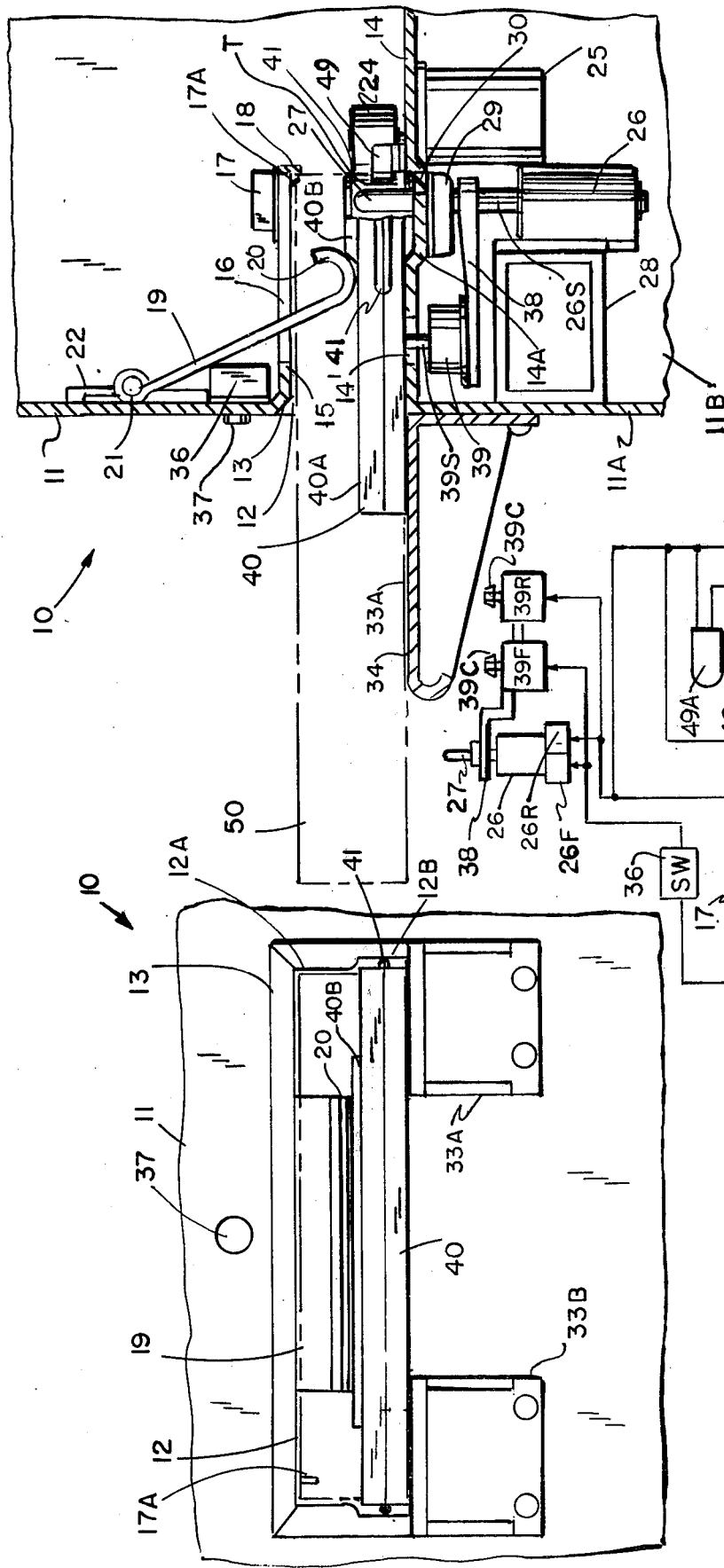
FIG. 1 is a front view of a portion of a magnetic transducing apparatus which is operable to receive and record on or reproduce from the tapes of either an endless magnetic tape containing cartridge or a reel-to-reel magnetic tape containing cassette.
FIG. 2 is a side view with parts broken away for clarity of the apparatus illustrated in FIG. 1.
FIG. 3 is a schematic diagram of a control system for the components illustrated in FIGS. 1 and 2.

FIG. 4 is a front view of a modified form of apparatus of the type illustrated in FIGS. 1 and 2, for transducing with respect to the tapes of cartridges or cassettes wherein separate openings are provided to respectfully receive a cartridge and a cassette and the common drive means is provided for the taps of either a cartridge or cassette inserted into said separate openings, and FIG. 5 is a side view with portions broken away for clarity of a portion of the apparatus illustrated in FIG. 4 showing the electro-mechanical components located in the lower portion of the housing thereof.

FIGS. 1 and 2 illustrate details of a magnetic transducing apparatus 10 for recording on and or reproducing from magnetic tapes provided in magazines of different configuration. Illustrated in FIG. 2 in operable location within the apparatus 10 is a magnetic tape reel-to-reel magazine or cassette 40 of the Philips type, while illustrated in broken line notation is a magnetic tape cartridge 50 of the so called Lear Jet type also located in operable location with respect to the apparatus 10.

The apparatus 10 comprises a housing 11 having a front wall 11A and a plurality of other walls, one of which 11B is shown in the cross sectional view. The front wall 11A contains an opening 12 therein a little larger than the lateral configuration of the cartridge 50, it being noted that the magazine 40 has a width which is just slightly larger than the width of the cartridge 50 and accordingly, the opening 12 is configured with an upper portion 12A conforming to and slightly larger than the upper portion of the lateral configuration of the cartridge and a lower portion 12B which is wider than the portion 12A and is configured to accommodate the cassette 40 when laterally disposed therein as illustrated. The front wall 12 contains a tapered portion 13 which inclines inwardly therefrom to facilitate insertion of both magazines. A lower shelf 14 and an upper shelf 15 extend inwardly from the opening 12 to guide the cartridge 50 to its operable position within the housing 11 such that the tape thereof is engaged by a magnetic transducer denoted 49, and a drive wheel 24 supported on the shaft of a gear motor 25 which is mounted on an extension of the lower shelf 14.

Transducer 49 may comprise a recording and/or reproduction head or a plurality of magnetic heads supported on a mount which is supported by shelf 14 in a position to engage the tape T just inside the opening in either magazine when it is operatively located as shown with wheel 24 operatively engaging the tape T.

The lower shelf 14 is also shaped to properly accommodate the housing of the cassette 40 which housing is composed of a main section 40A supporting the two tape reels and a forward section 40B of greater width than section 40A which accommodates tape guides, a backing device for the tape and an idler pin 27 which is inserted through an opening in the side wall thereof after the cassette is fully inserted into the opening 12 and housing 11 as will be described. The end wall of section 40B has openings 41 therein for accommodating the tape drive wheel 24 and one or more magnetic transducers for recording on and or reproducing from the tapes of both magazines.

Since the cartridge 50 is substantially greater in length than the length of the cassette 40, a supporting surface 34 is provided which may consist of separate shelve units 33A and 33B, separated from each other as illustrated in FIG. 1 to provide spacing therebetween to permit the shorter length cassette housing to be easily removed from the opening 12 by grasping the portion thereof which overhangs the front wall 11A between the units 33A and 33B.

In order to retain the cassette 40 in its operative location against the upper surface of shelf 14 during insertion and while it is inserted into the opening 12, a cantilevered leaf spring or spring mounted plate 19 is provided which is pivotally supported by a bracket 22 secured against the rear face of front wall 11-A above the shelf 15. The spring or plate 19 has a curved lower end 20 which slides against the upper surface of the cassette 40 as the latter is inserted and exerts a downward force thereon retaining the cassette flat against the upper surface of shelf 14. When fully inserted, the lower portion of the forward section 40B of the cassette housing 40 drops into a recess 14A in the shelf 14 as the tape drive wheel 24 is inserted into the opening 41 in the front wall of the housing 40. Freely rotatable pin 27 is supported by the shaft of a solenoid 26 which is operated to insert said pin into the lower opening in section 40B of housing 40 to position the pin directly behind the tape so that the tape of the cassette becomes frictionally engaged between the pin and the wheel 24. The operation of solenoid 26 is effected when the actuator 30 of a limit switch 29 supported by wall 14 and protruding upwardly through the recess 14A, is actuated by the lower front edge of the housing section 40B of the cassette 40, an action which does not occur when the cartridge 50 is fully inserted since the forward front edge thereof does not extend into the recess 14B. Closure of normally open limit switch 29 by the forward front edge of the cassette also results in operation of gear motor 25 to rotate drive wheel 24 and drive the tape of the cassette.

In order to permit removal of the cartridge 40 from the housing 11, a push button 37 extending from the actuator of a switch 36 and accessible from the front of wall 11A is depressed by hand causing the actuator of the bistable solenoid 26 to retract the idler pin 27 from the cassette, thus permitting withdrawal of the cassette from the opening 12. Further controls, not shown, may be provided against the front face of wall 11A for effecting manual forward and reverse drive of gear motor 25 when switch 14B is closed but not operable when said switch is opened so as to prevent reverse drive of the gear motor 25 when a cartridge 50 is operatively located in the opening 12 so as to prevent the unwanted unwinding of the tape therein.

A second limit switch 17 is supported above and to one side of the shelf 15 beyond the opening 16 therein which accommodates pivoted member 19, and contains an actuator arm 17A protruding downwardly into the path of the front end of the housing for the cartridge 50 such that said limit switch 17 closes when the cartridge is fully inserted into the opening 12. The monostable limit switch 17 is connected between a source of electrical energy and the forward drive for gear motor 25 and also connects the recording or reproduction transducer for the tape with a source of electrical energy.

It is noted that the single gear motor 25 is so located as to position the drive wheel 24 to locate the latter to engage the tapes of either of the magazines when fully inserted into the housing. The frictional engagement of the end portion 20 of spring member 19 with the upper surfaces of both the cassette 40 and the cartridge 50 is sufficient to retain both magazines firmly in the fully inserted positions yet both may be removed from the opening 12 by hand pulling same out of the housing. The spring or spring loaded arm 19 swings upwardly through the opening 16 in the upper shelf 15 as urged by the forward movement of the cartridge 50 thereagainst and bears down against the upper wall of cartridge 50 to retain same in place against a shelf 18 extending downwardly from the end of shelf 15.

The conventional Philips type magnetic tape cassette housing contains elongated bead-like protrusions 41 extending outwardly from the side walls thereof near the forward end of the cassette housing and, as illustrated in FIG. 1, the lower portion 12B of the opening 12 in the front wall 11A of the housing 11 is just wide enough to slidably accommodate the bead formations so that the cassette will be guided to its operative location within the housing 11 by the lower side walls of the guideway and therefore may not become misaligned in the guideway. In other words, the width of the upper portion 12A of the guideway which is adapted to accommodate the side walls of a cartridge 50 is preferably not of sufficient dimension to permit the wider cassette housing 40 to enter said upper portion which would cause its malfunction or jamming therein.

Also illustrated in FIG. 2 is an arm or shelf 38 supported by the shaft 26S of solenoid 26 and supporting one or more motors 39, the shafts 39S of which are normally retracted when the solenoid shaft 26S is retracted and rotatable pin 27 is also retracted below the upper surface of the indented portion 14A of the shelf 14 so that the cassette 40 may be fully inserted into the housing to provide the tape thereof engaged by the drive wheel 24. When the solenoid 26 is activated by closure of limit switch 29 when its actuator is deflected by the front wall of the cassette housing, the shafts 39S of the motors 39, each of which contains a coupling device of conventional design, are projected upwardly through respective openings 14' to engage the shaft couplings with the hubs of the respective reels of the cassette. The tape of the cassette is thus driven by the powered rotation of wheel 24 and is taken up onto either reel of the cassette depending on which of the reels is driven and the direction of rotation of reversible motor 25.

A typical control system for the apparatus of FIGS. 1 and 2 is illustrated in FIG. 3 wherein a power supply 48 such as a battery or source of alternating current, is connected to the various motors, transducers, solenoid, switches and an amplifier 55 for the reproduced signals, the output of which is connected to speaker or speakers denoted 56. A magnetic pickup 49 is shown in FIG. 3 as being electrically energized for reproducing signals from the tape with which it is in operative engagement when either the normally open limit 17 is closed by the forward upper edge of the housing of the cartridge 50 when fully inserted into housing 11 or the normally open limit switch 29 is closed by the leading edge of the cassette housing 40A when the forward portion 40B thereof enters the recess defined by the indented portion 14A of the lower shelf 14. If the transducer 49 is supported on a mount which is motor or solenoid driven to bring the transducer into operative engagement with different tracks of the tape in the cartridge 50, the output of switch 29 may also be connected to a suitable control for said motor or solenoid to bring the transducer 29 to its lowermost position to engage it against the track of the tape in the cassette 40A when switch 29 is closed thereby.

In FIG. 3, a second magnetic pickup 48 is illustrated which is adapted to engage a control track of the tape of the cassette 40 when the cassette is fully inserted into its operative position as illustrated in FIG. 2. Pickup 48 detects control signals recorded near each end of the tape of the cassette for the purpose of effecting the reverse drive of the tape of the cassette either in an automatic rewinding operation or to permit reproduction of signals recorded on a second track of the cassette tape by the head 49 which is automatically shifted to said second track in response to the reproduction of the end of tape signal or by a second reproduction head (not shown) which becomes energized in response to the signal generated when head 48 detects the end of track recording. The output of head 48 is shown connected through a normally closed switch 47 to the reverse control 25R for motor 25. The output of normally open switch 17 is connected to the switching input 47C of normally closed switch 47 so that when switch 17 is closed by the forward upper edge of the housing of a cartridge 50 inserted into housing 11, the reverse control 25R of motor 25 may not be activated so that the drive wheel 24 may not be driven in reverse while the tape of the endless loop tape cartridge 50 is engaged thereby, an action which would cause the removal of the tape from the cartridge housing.

Notation 46 refers to a manually operated control switch located on the control panel for the record playback apparatus 10 which is a double-throw switch for energizing either the forward drive control 25F or the reverse drive control 25R of motor 25, the latter being connected to the power supply 48 through switches 46 and 47 so that the motor 25 may not be reverse driven when switch 17 is closed by a cartridge.

A further bistable or double-throw manual panel switch 48 is also provided which connects to the fast-forward drive input for motor 25 and the fast reverse drive input for said motor, the latter connection also being made through switch 47 so that the motor 25 will not operate in fast reverse when switch 17 is closed.

Also illustrated in FIG. 3 are respective motors 39F and 39R which are supported on arm 38, the shafts of which motors become coupled to the hubs of a cassette 40 when it is fully inserted into the opening in housing 11 upon actuation of the solenoid 26 when switch 29 is closed energizing the forward drive input 26F of solenoid 26. Closure of pushbutton switch 36, by finger depression of actuator 37 thereof, connects power supply 48 to the reverse drive control input 26R of solenoid 26 retracting pin 27 and the couplings 39C of the drive shafts of motors 39F and 39R out of the way of the cassette 40 so that it may thereafter be removed from the opening 12 in housing 11.

It is noted that a conventional mechanical drive arrangement utilizing one of two electric motors for driving the wheel 24 and the hubs of the respective reels of a cassette, may replace the three drive motors illustrated in FIG. 3 and suitable mechanical or electromechanical controls therefore may be employed in the apparatus illustrated in FIGS. 1 and 2.

It is further noted that the gearmotor 25 may also have its output shaft directly connected to a record disc turntable which is rotatably supported on top of housing 11 or may be coupled thereto through a gear train thus providing the single motor as capable of driving the tapes of cartridges and cassettes and a record disc turntable of conventional design for reproducing audio recordings and/or video recordings from all three media.

FIGS. 4 and 5 illustrate another arrangement in a record playing unit 60 for recording on and or reproducing from the tape of either a Philips type cassette 40 or an endless loop tape cartridge 50 of the types described. The transducing apparatus 60 includes a housing 61 having a front wall 62, a rear wall 63, side walls 64 and a bottom wall 65, preferably in the configuration of a box-like enclosure which retains four laterally extending walls denoted 70, 71, 72 and 73. Walls 70 and 71 define a passageway above a second passageway defined by walls 72 and 73, the former passageway adapted to receive a magnetic tape cartridge 50 while the lower passageway is configured to receive a magnetic tape containing reel-to-reel cassette as described. The passageway 66 between the walls 70 and 71 tapers inwardly at the front end thereof by configuring the walls 62 and 70 with a downwardly sloping portion 67 and the walls 62 and 71 with an upwardly sloping portion 67' to facilitate insertion of a cartridge into the opening 66. Similarly, the front portion of the opening 68 defined between walls 72 and 73 is also provided with outwardly tapering wall portions 69 and 69' formed respectively between the front wall 62 and the upper and lower walls 72 and 73 of the passageway 68 so as to facilitate a cassette into the passageway 68.

Also provided in the passageway 68 are respective rib-like formations 73A and 73C protruding downwardly from the upper wall 72 near the opposite ends of the opening 68 which cooperate with rib-like formations 73B and 73D which protrude upwardly from the lower wall 73, in guiding the edge portions of the housing of a cassette 40 longitudinally through the opening 68 and retaining the cassette centered and level within said opening so that the tape T thereof will be properly engaged by a resilient drive wheel 91. The drive wheel 91 is supported on a shaft 88 which is rotatably supported by bearings 89 and 90 which are respectively supported by the walls 72 and 73. Shaft 88 extends upwardly from upper wall 72 and has a pulley 87 connected thereto. A looped belt 86 winds around pulley 87 and around the second pulley 85 connected to a shaft 83 extending from a reversible drive motor 82 which is supported by shelf 72 and extends through an opening 74 in shelf 73 as shown. Shaft 83 is also supported by a bearing 84, supported by shelf 71, and extends upwardly therefrom into the passageway 66 between shelves 70 and 71. A second drive wheel 81 is secured to the end of shaft 83 in alignment with the opening 53 in the end wall 52 of the housing 51 of a cartridge 50 when fully inserted into the passageway 66 so that it engages the tape TC of the cartridge against the conventional tape supporting wheel 54 which is supported for rotation by the side walls of the cartridge 51.

A first monostable, normally open limit switch 76 has its actuator 77 extending through an opening 71A in wall 71 a degree such that said actuator will become deflected and close the contacts of the limit switch 76 when the forward edge of the end wall 52 of the housing 51 of a cartridge is fully inserted into the passageway 66, as shown. The switch 76 serves the same function as the switch 17 of FIG. 2 and may be utilized in a circuit, such as that illustrated in FIG. 3, for effecting the drive of gear motor 82 in a direction to properly drive the tape TC of the cartridge 50 for recording or playback purposes. The transducing means for the cartridge is not shown in FIG. 5 although it may be constructed and mounted in accordance with conventional transducing apparatus associated with a cartridge recorder or player unit such as the conventional 8-track lear jet cartridge player unit.

A normally open, monostable limit switch 79 is located with its actuator 80 extending upwardly through an opening 73A in shelf 73 such that the actuator will be deflected and close the switch when the forward edge of the housing of a cassette 40 is fully inserted into the passageway 68, as illustrated, and the tape of the cassette is engaged by the drive wheel 91. A conventional time delay relay may be employed to delay the operation of motor 82 after switch 79 is closed without delaying the operation of a solenoid 94 which projects a freely rotating pin 95 behind the tape T upwardly through an opening 73E in shelf 73 and the side wall opening provided in the conventional magnetic tape cassette of the Philips type so that the wheel 91 may cooperate with the freely rotatable extension of the solenoid shaft 95 in driving the tape T therebetween. Also provided, although not shown in FIG. 5, is a mechanism, constructed in accordance with the teachings of FIGS. 1–3 or in accordance with the conventional cassette recorder-playback unit for engaging respective coupling means at the ends of drive shafts with the hubs of the reels for the tape in the cassette 40 when the solenoid 94 is activated. Said mechanism may be similar to that illustrated in FIG. 2 which comprises respective forward and reverse drive motors connected to an arm or plate extending laterally from the shaft of the solenoid 94 to position the forward and reverse reel drive coupling means of the mechanism or respective shafts of the forward and reverse drive motors of the type described to cause same to engage the respective supply and takeup reel hubs of the cassette inserted into the opening 68 when solenoid 94 is activated by the closure of the limit switch 79.

A manually actuated normally open monostable switch 92 is mounted on the front wall 62 of housing 61 and has its pushbutton actuator 93 extending outwardly from the front wall. Depressing actuator by hand causes switch 92 to connect a power supply to the reverse control input of solenoid 94, thereby retracting pin 95 and the drive means (not shown) for the hubs of the cassette, below the upper surface of wall 73 so that the cassette may be easily removed from the housing by pulling it out of the opening 68.

The means provided in FIGS. 2 and 3 for preventing motor 82 from operating in that direction which will cause wheel 81 to unwind tape TC from its coil formation in housing 51, may also be utilized in the apparatus of FIGS. 4 and 5 wherein motor 82 is prevented from such operation when switch 76 is closed.

In a modified form of the apparatus 60, the shaft 83 of gearmotor 82 or shaft 88 may extend either directly to a record disc turntable located above the housing 61 or therein for directly power rotating same when a panel switch is closed to start motor 82 or may be coupled to such a turntable of conventional design through gears located, for example above shelf 70 in a gear housing supported by said shelf and/or the sidewalls of the housing 61.

I claim:

1. An apparatus for reproducing signals recorded on magnetic tape disposed in containers of at least two different sizes comprising in combination:

a support including a housing having an outer wall with first and second openings therein for respectively receiving and permitting tape containing cartridges of different configurations to be inserted into said housing for the playback of signals recorded on the tapes of said cartridges, wherein one of said cartridges contains supply and take-up reel means for the tape thereof with said take-up reel means adapted to be driven to take up the tape during the reproduction of recordings therefrom, first guide means aligned with a first of said openings in said housing for receiving and guiding said first tape cartridge in a predetermined path into said housing, first transducing means and first drive means aligned with said first means for engaging the tape of said first cartridge and means for driving said tape through said cartridge, second guide means aligned with a second of said openings in said wall of said housing for receiving and guiding a cartridge of a second configuration containing an endless tape into said housing, a second transducing means and a second drive means aligned with said second guide means for engaging and driving the tape through said second cartridge when said second cartridge is inserted into said opening in said housing, and an electric motor supported within said housing and operatively connected to power operate both said first and second drive means whereby a single source of power may be utilized to drive the tapes of either of said first or second cartridges inserted into said housing.

2. An apparatus in accordance with claim 1 wherein said first opening in said wall of said housing and said first guide means are configured to receive and operatively locate within said housing a tape cartridge containing an endless record tape wound in a coil within the cartridge housing and operable to be driven from the inside of said coil and guided in a fixed path adjacent to a wall of said cartridge housing and back onto the outside of said coil and wherein an opening is provided in a wall of said cartridge to permit access to the tape thereof by said first transducing means and said first drive means, and said second opening in said housing and said second guide means are configured to receive and guide a magnetic tape cartridge containing a magnetic tape extending between respective supply and take-up reels supported within the container thereof and adapted to be driven in a fixed path past an opening in a wall of its housing to permit access to the tape thereof by said second transducing means and said second drive means, said second drive means being reversible to permit the reverse drive of the tape in said second cartridge and means for preventing a reverse operation of said first drive means while it is in operative relation with the tape of said first cartridge when inserted into said first opening in said housing.

3. An apparatus in accordance with claim 2 wherein said means for preventing the reverse operation of said first drive means when a cartridge is inserted into said housing includes a limit switch supported within said housing and operable to be activated upon the insertion of a cartridge into one of said first and second openings in said housing and control means responsive to the activation of said switch for preventing the reverse operation of said first drive means when a cartridge is inserted into said first opening in said housing.

4. An apparatus in accordance with claim 3 wherein said limit switch comprises a normally open, monostable switch operable to be closed by the insertion of a cartridge into said second opening in said housing, first control means for effecting the reverse operation of said second drive means to reverse drive the tape of a cartridge inserted into said housing, a power supply, said first control means being operatively connected in circuit with said switch and said power supply in a manner to permit the operation of said reverse drive means only when said switch is closed by the insertion of a cartridge into said second opening in said housing.

5. An apparatus in accordance with claim 1, including supply and take-up reels rotationally supported in the cartridges adapted to be inserted into said second opening in said housing and guide means for guiding the tapes thereof between said reels, said latter cartridges each having side walls containing openings therein which openings are located directly behind portions of the tapes extending between said reels, said second drive means including a first cylindrical means rotatably supported by said housing and located to engage the tape of a cartridge fully inserted into said first opening in said housing, second cylindrical means, lineal actuating means for axially moving said second cylindrical means, said second cylindrical means being located in direct alignment with said opening in the side wall of a cartridge fully inserted into said first opening in said housing, said lineal actuating means being operable to move said second cylindrical means to a retracted position whereby said second cylindrical means clears the side wall of a cartridge inserted into said second opening in said housing and to also move said second cylindrical means to a position whereby it is inserted thereafter into said opening in the side wall of said cartridge when the cartridge is fully inserted into said second opening in said housing, said motor being operatively connected to drive one of said first and second cylindrical means to effect the driving of the tape disposed therebetween.

6. An apparatus in accordance with claim 4 including means for controlling said lineal actuating means to retract said second cylindrical means and manually operable means for operating said latter control means to permit said second cartridge to be removed from said housing.

7. An apparatus for reproducing signals recorded on magnetic tape disposed in magazines of at least two different sizes comprising in combination:

a first support including a housing having opening means for receiving and permitting tape containing magazines of different sizes to be inserted into said housing for the playback of signals recorded on the tapes thereof, fixed first and second guide means including a common guide surface for guiding said different size magazines along a fixed path defined by said common guide surface to operative locations within said housing, each of said different size magazines having respective openings in the walls thereof and means for guiding each of the tapes of said magazines in predetermined paths past said openings to permit access to the tapes of each magazine from the exterior of the magazine, magnetic transducing means and motor operated drive means for the tapes of said magazines including at least one drive wheel means rotatably supported within said housing and located to become operatively engaged with the tapes of both of said magazines when each of said magazines are operatively located within said housing, a first of said magazines having an endless loop formation of tape would therein in a coil and means for guiding said tape in a fixed path from the inside of said coil back on to the outside thereof, idler wheel means supported behind the tape of said first magazine in alignment with the opening in the wall thereof and aligned with said drive wheel means to engage the tape therebetween when said first magazine is operatively located within said housing whereby said tape may be pinched between the two wheel means and driven when said drive wheel means is driven, a second of said magazines supply and take-up reels rotatably supported within the magazine with the tape thereof wound between said reels, and a second support, respective first and second drive means supported by said second support for driving said supply and take-up reels for said tape of said second magazine.

coupling means for connecting said first and second drive means to said supply and take-up reels, motor means operable to drive said second support and cause said coupling means to engage the supply and take-up reels of said second magazine when operatively located on said first support, means for operating said motor means for retracting said second support to disengage said coupling means from said supply and take-up reels, and means for controlling said motor means including switch means actuated when said second magazine is moved to its operative location in said housing and operative to control said motor means to drive said second support to cause said coupling means to engage said drive and take-up reels of said second magazine, and fixed first and second guide means for engaging and selectively driving said reels of said second magazine to take up the tape driven past said opening by said drive wheel means when said second magazine is at its operative location within said housing.

8. An apparatus for transducing signals relative to magnetic tapes disposed in magazines of different configurations comprising in combination:

a first support including a housing, first and second magnetic tape magazines each of a different configuration and each having substantially parallel major front and rear walls joined together by respective edge walls, each of said magazines having a front edge wall portion with respective openings therein and respective means for guiding the tapes thereof facewise past said openings to expose portions of said tapes and permit transducing with respect to the exposed portions, and wherein said first magazine contains an endless loop formation of magnetic tape and said second magazine comprises a cassette containing supply and take-up reels rotatably supported therein, an opening in a wall of said housing of said first support and respective plural fixed guide means extending from said opening for receiving and guiding each of said magazines to operative locations within said housing, power operated wheel means supported by said first support and engageable with the tapes of said first and second magazines through said openings in said magazines when said magazines are respectively operatively located on said first support, a second support movably supported by said first support, first drive means for the reels of a cassette, supported by said second support, second drive means for engaging and driving the tape of a cassette when said cassette is at its operative location, third drive means including an electrically operated motor means supported by said first support for power driving said second support between a retracted position wherein said first drive means is out of the way of magazines inserted into said opening in said wall of said housing to a position wherein said first drive means may operatively engage the reels of a cassette which is operatively located within said housing, limit switch sensing means operable for sensing when a cassette is at its operative location for controlling operation of said second drive means to move said second support and to cause said first drive means to engage said reels of a cassette which is operatively located in said housing whereby the operation of said first and said second drive means thereafter will cause the tape of a cassette to be driven onto one of said reels past the opening in the wall of said cassette.

* * * * *